US008840717B2

(12) United States Patent
Naidoo et al.

(10) Patent No.: US 8,840,717 B2
(45) Date of Patent: *Sep. 23, 2014

(54) ASPHALT MODIFIERS FOR "WARM MIX" APPLICATIONS INCLUDING ADHESION PROMOTER

(71) Applicant: Akzo Nobel N.V., Arnhem (NL)

(72) Inventors: Premnathan Naidoo, Diamondhead, MS (US); Sundaram Logaraj, Aurora, IL (US); Alan Duncan James, Chicago, IL (US)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,600

(22) Filed: May 2, 2013

(65) Prior Publication Data

US 2013/0239850 A1 Sep. 19, 2013

Related U.S. Application Data

(63) Continuation of application No. 12/742,790, filed as application No. PCT/EP2008/065281 on Nov. 11, 2008, now Pat. No. 8,440,011.

(60) Provisional application No. 60/987,929, filed on Nov. 14, 2007.

(30) Foreign Application Priority Data

Dec. 5, 2007  (EP) ................................. 07122340

(51) Int. Cl.
*C08L 95/00* (2006.01)
*C08L 93/00* (2006.01)
*C08L 91/06* (2006.01)

(52) U.S. Cl.
USPC ........ 106/273.1; 106/232; 106/235; 106/268; 106/269; 106/272; 106/284.06; 106/284.4; 106/500; 106/502

(58) Field of Classification Search
USPC .............. 106/232, 235, 268, 269, 272, 273.1, 106/284.06, 284.4, 500, 502; 524/64
See application file for complete search history.

(56) References Cited

U.S. PATENT DOCUMENTS

| | | |
|---|---|---|
| 1,014,103 A | 1/1912 | Wallbaum |
| 1,373,661 A | 4/1921 | Johansen |
| 1,384,805 A | 7/1921 | McSwiney |
| 1,542,626 A | 6/1925 | MacKay |
| 1,640,544 A | 8/1927 | Headley |
| 1,674,523 A | 6/1928 | Sadtler |
| 1,778,760 A | 10/1930 | Hay |
| 1,815,089 A | 7/1931 | Alsdorf |
| 1,834,552 A | 12/1931 | Sadtler et al. |
| 1,842,139 A | 1/1932 | Alsdorf |
| 1,887,518 A | 11/1932 | Sadtler |
| 1,888,295 A | 11/1932 | Smith |
| 1,932,648 A | 10/1933 | Taylor |
| 1,948,881 A | 2/1934 | Kirschbaum |
| 1,988,336 A | 1/1935 | Roediger |
| 1,988,879 A | 1/1935 | Steininger |
| 2,023,068 A | 12/1935 | Flood |
| 2,025,945 A | 12/1935 | Forrest |
| 2,046,902 A | 7/1936 | Kirschbaum |
| 2,087,401 A | 7/1937 | Fair |
| 2,191,295 A | 2/1940 | Dohse |
| 2,243,519 A | 5/1941 | Barth |
| 2,283,192 A | 5/1942 | Ditto |
| 2,317,959 A | 4/1943 | Johnson et al. |
| 2,340,449 A | 2/1944 | Barwell |
| 2,374,732 A | 5/1945 | Colburn |
| 2,427,488 A | 9/1947 | Anderson et al. |
| 2,461,971 A | 2/1949 | Fischer |
| 2,550,481 A | 4/1951 | Jense |
| 2,582,823 A | 1/1952 | Fowkes |
| 2,766,132 A | 10/1956 | Blair et al. |
| 2,861,787 A | 11/1958 | Csanyi |
| 2,888,418 A | 5/1959 | Albanese et al. |
| 2,901,369 A | 8/1959 | Pordes |
| 2,917,395 A | 12/1959 | Csanyi |
| 2,919,204 A | 12/1959 | Dybalski et al. |
| 3,259,513 A | 7/1966 | Dickson et al. |
| 3,284,388 A | 11/1966 | Stierli |
| 3,855,167 A | 12/1974 | Bowman |

(Continued)

FOREIGN PATENT DOCUMENTS

| | | |
|---|---|---|
| AU | 433003 | 8/1970 |
| AU | 2006231250 | 10/2006 |

(Continued)

OTHER PUBLICATIONS

AKZO International Highway Chemical Newsletter, Chemical Division, Spring 1989, pp. 1-9.
Anderson, David A. et al, "The Effect of Antistrip Additives on the Properties of Asphalt Cement," Asphalt Paving Technology vol. 51, Feb. 22, 23 & 24, 1982, pp. 298-317.
Barreto, "Warm Asphalt Mixes Containing Dispersed Water," ARKEMA-CECA France, Abstract No. "658, 2006, 7 pgs.
Bonola et al., "Technologies for the Production of Asphalt Mixes with Low Temperature Processes," World Road Association Italian National Committee Dec. 2005, 31 pgs.
Butz, Thorsten et al., "Modification of Road Bitumens with the Fischer-Tropsch Paraffin Sasobit" Journal of Applied Asphalt Binder Technology, vol. 1, Issue 2. Oct. 2001 p. 70-86.
Caillot et al., "Warm Mix Asphalts and Cold Recycling for Controlled Use of Effective Road Techniques Reducing Nuisances," Tech. Dept. for Transport . . . France, 12 pgs. undated.

(Continued)

*Primary Examiner* — Helene Klemanski
(74) *Attorney, Agent, or Firm* — Sugiarto Hadikusumo

(57) ABSTRACT

The present invention generally relates to an additive package for warm-mix asphalt formulations for the pavement of road surfaces, said additive package comprising a) surfactant component, and b) an asphalt rheology modifying component, wherein said asphalt rheology modifying component comprises at least one of a i) a wax component and ii) a resin component. The invention also relates to a warm mix asphalt having improved compaction at lower temperatures, and to a pavement made from said warm mix asphalt.

14 Claims, No Drawings

(56) References Cited

U.S. PATENT DOCUMENTS

| | | | |
|---|---|---|---|
| 3,904,428 A | 9/1975 | McConnaughay | |
| 4,197,209 A | 4/1980 | Zinke et al. | |
| 4,198,177 A | 4/1980 | Brett et al. | |
| 4,234,346 A | 11/1980 | Latta, Jr. et al. | |
| 4,244,747 A | 1/1981 | Leonard, Jr. et al. | |
| 4,348,237 A | 9/1982 | Ruckel | |
| 4,592,507 A | 6/1986 | Benedict | |
| 4,692,350 A | 9/1987 | Clarke et al. | |
| 4,724,003 A | 2/1988 | Treybig et al. | |
| 4,747,880 A | 5/1988 | Berrido et al. | |
| 4,836,857 A | 6/1989 | Hopkins | |
| 5,109,041 A | 4/1992 | Matsuno et al. | |
| 5,539,029 A | 7/1996 | Burris | |
| 5,622,554 A | 4/1997 | Krogh et al. | |
| 5,721,296 A | 2/1998 | Mizunuma et al. | |
| 5,743,950 A | 4/1998 | Hendriks et al. | |
| 5,772,749 A | 6/1998 | Schilling et al. | |
| 5,788,755 A | 8/1998 | Salminen | |
| 5,827,360 A | 10/1998 | Salminen | |
| 5,925,233 A * | 7/1999 | Miller et al. | 208/48 AA |
| 6,136,898 A | 10/2000 | Loza et al. | |
| 6,197,837 B1 | 3/2001 | Hill et al. | |
| 6,362,257 B1 * | 3/2002 | Chehovits et al. | 106/502 |
| 6,451,885 B1 | 9/2002 | Dresin et al. | |
| 6,494,944 B1 * | 12/2002 | Wates et al. | 106/277 |
| 6,559,206 B1 | 5/2003 | Durand et al. | |
| 6,576,050 B1 | 6/2003 | Samanos | |
| 6,588,974 B2 | 7/2003 | Hildebrand et al. | |
| 6,793,964 B2 | 9/2004 | Hoad | |
| 6,846,354 B2 | 1/2005 | Larsen et al. | |
| 6,913,416 B2 | 7/2005 | Hildebrand et al. | |
| 7,041,165 B2 | 5/2006 | Malot | |
| 7,114,843 B2 | 10/2006 | Romier et al. | |
| 7,114,875 B2 | 10/2006 | Romier et al. | |
| 7,160,943 B2 | 1/2007 | Burris et al. | |
| 7,297,204 B2 | 11/2007 | Crews et al. | |
| 7,309,390 B2 | 12/2007 | Falkiewicz | |
| 7,732,511 B2 | 6/2010 | Barreto et al. | |
| 7,815,725 B2 * | 10/2010 | Reinke et al. | 106/284.06 |
| 7,968,627 B2 | 6/2011 | Reinke et al. | |
| 7,981,466 B2 | 7/2011 | Reinke et al. | |
| 7,981,952 B2 | 7/2011 | Reinke et al. | |
| 8,034,172 B2 | 10/2011 | Naidoo et al. | |
| 8,404,037 B2 * | 3/2013 | Naidoo et al. | 106/273.1 |
| 8,440,011 B2 * | 5/2013 | Naidoo et al. | 106/273.1 |
| 2002/0170464 A1 | 11/2002 | Larsen et al. | |
| 2004/0014845 A1 | 1/2004 | Takamura et al. | |
| 2004/0223808 A1 | 11/2004 | Romier et al. | |
| 2004/0244646 A1 | 12/2004 | Larsen et al. | |
| 2005/0018530 A1 | 1/2005 | Romier et al. | |
| 2005/0101701 A1 | 5/2005 | Stuart, Jr. et al. | |
| 2005/0101702 A1 | 5/2005 | Stuart, Jr. et al. | |
| 2005/0284333 A1 | 12/2005 | Falkiewicz | |
| 2006/0041101 A1 | 2/2006 | Heinrichs et al. | |
| 2006/0086288 A1 | 4/2006 | Bourrel et al. | |
| 2006/0169173 A1 | 8/2006 | Dupuis et al. | |
| 2006/0236614 A1 | 10/2006 | Antoine et al. | |
| 2006/0240185 A1 | 10/2006 | Antoine et al. | |
| 2006/0288907 A1 | 12/2006 | Fox | |
| 2007/0039520 A1 | 2/2007 | Crews et al. | |
| 2007/0060676 A1 | 3/2007 | Reinke | |
| 2007/0082983 A1 * | 4/2007 | Crews et al. | 106/277 |
| 2007/0191514 A1 | 8/2007 | Reinke et al. | |
| 2007/0199476 A1 | 8/2007 | Bobee et al. | |
| 2009/0088499 A1 | 4/2009 | Barreto et al. | |
| 2009/0203815 A1 | 8/2009 | Barreto et al. | |
| 2010/0055304 A1 | 3/2010 | Reinke et al. | |
| 2010/0199885 A1 | 8/2010 | Naidoo et al. | |
| 2010/0227954 A1 | 9/2010 | Naidoo et al. | |
| 2010/0319577 A1 | 12/2010 | Naidoo et al. | |
| 2011/0017096 A1 | 1/2011 | Reinke | |
| 2011/0020537 A1 | 1/2011 | Reinke | |
| 2011/0021673 A1 | 1/2011 | Reinke | |
| 2011/0152410 A1 | 6/2011 | Reinke | |
| 2011/0214589 A1 | 9/2011 | Reinke | |

FOREIGN PATENT DOCUMENTS

| | | | |
|---|---|---|---|
| DE | 10 2007 027 306 A1 | | 12/2008 |
| EP | 0568021 A2 | | 11/1993 |
| EP | 1 247 891 A2 | | 10/2002 |
| EP | 1247891 | * | 10/2002 |
| EP | 1398351 | | 3/2004 |
| EP | 1469038 | | 10/2004 |
| GB | 429548 | | 5/1935 |
| GB | 783 015 | | 9/1957 |
| GB | 783015 | * | 9/1957 |
| GB | 2234512 | * | 2/1991 |
| GB | 2234512 A | | 2/1991 |
| JP | 02-228363 | | 9/1990 |
| JP | 2002/332606 | | 11/2002 |
| JP | 2006/132131 A | | 5/2006 |
| RU | 2119513 | | 9/1998 |
| RU | 2149848 | | 5/2000 |
| RU | 2186044 | | 7/2002 |
| RU | 2196750 | | 1/2003 |
| SU | 806636 A1 | | 2/1981 |
| SU | 834041 | | 5/1981 |
| WO | WO 95/22661 | | 8/1995 |
| WO | WO 99-57199 | | 11/1999 |
| WO | WO 01/16233 | | 3/2001 |
| WO | WO 01/16233 A1 | | 3/2001 |
| WO | WO 01/62852 | | 8/2001 |
| WO | WO 02/16499 | | 2/2002 |
| WO | WO 02053645 | | 7/2002 |
| WO | WO 02/103116 | | 12/2002 |
| WO | WO 2005/081775 A2 | | 9/2005 |
| WO | WO 2006/106222 | | 10/2006 |
| WO | WO 2007/032915 A2 | | 3/2007 |
| WO | WO 2007/054503 A1 | | 5/2007 |
| WO | WO 2007/112335 A2 | | 10/2007 |
| WO | WO 2008/148974 A2 | | 12/2008 |
| WO | WO 2009/013328 A1 | | 1/2009 |
| WO | WO 2009/033060 A1 | | 3/2009 |
| WO | WO 2009/062925 A1 | | 5/2009 |

OTHER PUBLICATIONS

Ceca Arkema Group, "Green Road Formulation—Warm Asphalt Mix. 2007 Innovation: helping to lower our planet's temperature," www.siliporite.com, accessed Nov. 21, 2007, 1 pg.

Cervarich, "Cooling Down the Mix" NAPA Explores New "Warm Mix Asphalt" Technologies Developed in Europe, Hot Mix Asphalt Technology, Mar./Apr. 2003, pp. 13-16.

Choi, Y., Warm Asphalt Review, Austroads Report, Arrb Research, RETT220B, Publication No. AP-T91/07, Nov. 2007.

D'Angelo, John, et al., "Warm-Mix Asphalt: European Practice," International Technology Scanning Program, Feb. 2008 62 pgs.

Damm, K., et al. "Asphalt Flow Improvers as Intelligent Fillers for Hot Asphalts—A New Chapter in Asphalt Technology," J. App. Asphalt Binder, vol. 2, Iss. 1, p. 36-70, Apr. 2002.

Declaration of Patrick Lavin, Jun. 6, 2011.

Diefenderfer et al., "Research Report: Installation of Warm Mix Asphalt Projects in Virginia," Virginia Transportation Research Council, Apr. 2007, 34 pgs.

Florida Department of Transporation, Standard Specifications for Road and Bridge Construction, 2007, pp. 244-252 and 772-784.

Gaudefroy, et al., "Laboratory Investigations on the Mechanical Performances of Foamed Bitumen Mixes Using Half-Warm Aggregates," TRB 2007 Ann. Mtg. CD-ROM, Aug. 1, 2006 20 pgs.

Giannattasio, Allessandro, "To Improve the quality of road bitumen," Reprint from the Italian Building and Construction Issue No. 69/1998—19th Year; pp. 2,3,7.

Gibson, Nelson, Modified Asphalt Research Activities at FHWA's Turner-Fairbank Highway Research Center, Pavement Materials snd Construction Team, AMAP Conf., Feb. 2005 18pgs.

Goh et al, Laboratory Evaluation and Pavement Design for Warm Mix Asphalt Proceedings of the 2007 Mid-Continent Transportation Research Symposium, Ames, IA, Aug. 2007, 11pgs.

Gudimettla, Jagan M., et al, "Workability of Hot Mix Asphalt," National Center for Asphalt Technology, Apr. 2003, 66 pgs.

Hurley et al.,"Evaluation of Aspha-Min Zeolite for Use in Warm Mix Asphalt," National Center for Asphalt Technology Report, Auburn University, 30 pgs., Jun. 2005.

(56) References Cited

OTHER PUBLICATIONS

Hurley et al., "Evaluation of Evotherm for Use in Warm Mix Asphalt," National Center for Asphalt Technology Report, Auburn University, Jun. 2006, 49 pgs.

Hurley et at., "Evaluation of Potential Processes for Use in Warm Mix Asphalt," National Center for Asphalt Technology,—2006, 46 pgs.

Hurley, Graham C., et al, "Evaluation of Sasobit for Use in Warm Mix Asphalt," National Center for Asphalt Technology Report, Auburn University, Jun. 2005, 32 pgs.

International Search Report issued in PCT/US/2006/33907, mailed Sep. 24, 2007, 4 pgs.

International Search Report issued in PCT/US2009/052830, mailed Sep. 16, 2010, 2 pages.

International Search Report—issued in PCT/US2008/075452, mailed Feb. 13, 2009; 3 pages.

International Search Report for PCT/US2009/034742, mailed May 26, 2009 4 pages.

Iterchimica Company; "Abstract of the 2005 production categories and applications," Iterchimica Brochure, p. 2 (2005).

James, A.D., et al., "Adhesion Agents for Use in Hot Mixes and Cut-Back Bituments," presented at the 3rd IRF MIddle East Regional Meeting, Riyadh, Saudi Arabia, 1988, 10 pgs.

Jenkins et al, "Half-Warm Foamed Bitumen Treatment, A New Process," 7th Conference on Asphalt Pavements for Southern Africa, 1999,7 pgs.

Jones, "Warm Mix Asphalt Pavements: Technology of the Future?" Asphalt, Fall 2004, pp. 8-11.

Kanitpong, Kunnawee, et al., "Laboratory Study on Warm Mix Asphalt Additives," Paper No. 07-1364. TRB 2007 Annual Meeting CS-ROM, 20 pgs.

Koenders et al., "Innovative proeess in asphalt production and application to obtain lower operating temperatures," 2nd Eurasphalt & Eurobitume Con. 2000, Book II pp. 830-840.

Kristjansdottir, Olof. "Warm Mix Asphalt for Cold Weather Paving," a thesis, University of Washington, 2006, 127pgs.

Kristjansdottir, Olof, et al., "Assessing the Potential for Warm Mix Asphalt Technology Adoption," TRB 2007 Annual Meeting CD-ROM,19 pgs.

LaPointe, Dennis G., e-mail correspondence, May 2011,4 pgs.

Lavin, Patrick, "Asphalt Pavements: A practical guide to design, production and maintenance for engineers and architects," 2003, pp. 347.

Logaraj, Sundaram, et at, "Surface-active bitumen additive for warm mix asphalt with adhesion promoting properties," 2009, 12 pgs.

International Search Report dated Dec. 2, 2008 of related PCT application No. PCT/EP2008/059685.

"Low Energy Asphalt (LEA) with the Performance of Hot-Mix Asphalt (HMA)", European Roads Review. Special Issue, BGRA, Feb. 2004 (pp. 1-11).

Malick, R.BN, Bradley, J.E., Bradbury, R.L., An Evaluation of Heated Reclaimed Asphalt Pavement (RAP) Material and Wax Modified Asphalt for Use in Recycled Hot . . . (HMA). 2007.

Modern Asphalts, "A safer future through designing for maintenance," Autumn 2006, Issue No. 18, 4 pgs.

Naidoo, P., "Fischer-Tropsch Hard Wax Chemistry in Warm Mix Asphalt Applications," Petersen Asphalt Research Conference, Abstract and Presentation Slides, Jun. 20-22, 2005.

Naidoo, P., "Sasohit in Warm Mix Asphalt Applications 9 Years of Global Successes," World Asphalt Conference Presentation Slides, Mar. 14, 2006.

Paez, R., "Production of Modifier Asphalt Additives in Equator," 2005 International Symposium on Pavement Recycling, Sau Paulo, Brazil, Mar. 14-16, 2005, pp. 1-11.

Petersen, J. Claine, "Relationships Between Asphalt Chemical Composition and Performance-Related Properties," ISSA Meeting, Phoenix Arizona, Jan. 23-27, 1982. 10th page.

Progress Report 2006, The German Bitumen Forum, Jun. 2006, 36 pgs.

Prowell, Brian D., et al., "Field Performance of Warrn Mix Asphalt at the NCAT Test Track," Paper No. 07-2514, TRB 2007 Annual Meeting CD-ROM, 15 pgs.

Sasobit Product Information 124, The Bitumen Additive for Highly Stable Easily Compactible Asphalts, 9 pgs.

Sasobit Product Information, Roads and Trials with SASOBIT, Oct. 2005, 7.pgs.

Schwartz, Anthony M., et al., Surface Active Agents and Detergents, vol. 2, 1977, pp. 673-677.

Tarrer, A.R., et al., "The Effect of the Physical and Chemical Characteristics of the Aggregate on Bonding," Strategic Highway Research Program, Feb. 1991,31 pgs.

Transportation Research Board of the National Academies, 86th Annual Meeting agenda Jan. 21-25, 2007. 37pgs.

Wasiuddin, Nazimuddin M. et al., "A Comparative Laboratory Study of Sasobit and Aspha-Min in Warm Mix Asphalt," TRB 2007 Annual Meeting CD-ROM. submitted Aug. 1, 2006, pp. 1-12.

European Search Report dated Sep. 25, 2008 for related Application No. 07122340.8-2115.

International Search Report dated Mar. 18, 2009 for related Application No. PCT/EP2008/065278.

Akzo Nobel Technical Bulletin, Adhesion Promoters, 1999.

Amdor 9 bulletin (in Russian).

Translation of Amdor 9 bulletin and application.

Boldyrev et al., Presentation at a seminar at MADI, a technical university in Moscow, Apr. 19-22, 2005.

Translation of Boldyrev et al., Presentation at a seminar at MADI, Apr. 19-22, 2005.

Chiman et al., "Aspectos de Influencia de Aditivos no Polimetricos Sobre Caracteristicas de Asfaltos," a paper presented at CILA conference, 2005.

Translation of Chiman et al., "Aspectos de Influencia de Aditivos no Polimetricos Sobre Caracteristicas de Asfaltos," a paper presented at CILA conference, 2005.

Declaration of Jan Alboszta with attachments.

Declaration of Gerald H. Reinke.

DIN 1995, Requirements for the binders, 1989.

Excerpt from Akzo Chemie brochure entitled "Armour Hess Products: Cationic Road Technology," 1970.

Russian State Standard GOST 9128-97 "Asphaltic concrete mixtures for roads and aerodromes and asphaltic concrete", developed in 1998, brought into effect Jan. 1, 1999.

Kosmin et al., "Compressibility of Activated Mineral Powders," 1991.

Redikote E-6 product bulletin, 2003.

Redikote E-6 MSDS, 2003.

American Association of State Highway and Transportation Officials, "Standard Method of Test for Preparing and Determining the Density of Hot-Mix Asphalt . . . ," 2005.

American Association of State Highway and Transportation Officials, "Standard Method of Test for Viscosity Determination of Asphalt Binder Using Rotational Viscometer," 2005.

Wasiuddin et al., "Effect of Antistrip Additives on Surface Free Energy Characteristics of Asphalt Binders for Moisture-Induced Damage Potential," Apr. 18, 2006, Abstract.

Shenoy, "Effect of Using Dispersants During the Mixing of Aggregates with Polymer-Modified Asphalts," J. of Dispersion Sci. and Tech., 21(5), 589-604 (2000).

English Machine Translation of DE 10 2007 027 306 Al.

\* cited by examiner

ASPHALT MODIFIERS FOR "WARM MIX" APPLICATIONS INCLUDING ADHESION PROMOTER

CROSS-REFERENCES TO RELATED APPLICATIONS

This application is a continuation of U.S. patent application Ser. No. 12/742,790, filed May 13, 2010, now U.S. Pat. No. 8,440,011, which is a National Stage entry of International Application PCT/EP2008/065281, filed Nov. 11, 2008, which claims the benefit of European Patent Application No. 07122340.8, filed Dec. 5, 2007 and U.S. Patent Application No. 60/987,929, filed Nov. 14, 2007. The contents of the aforementioned applications are incorporated herein by reference in their entireties.

FIELD OF INVENTION

The present invention generally relates to a novel combination of surfactants and asphalt modifiers that facilitates the mixing, lay down and compaction of asphalt mixes at lower than normal temperatures, while at the same time significantly improving the moisture resistance properties of hot or warm asphalt mixes. This duel effect of a single additive package differentiates the claimed invention from current "Warm Mix" Asphalt technologies. Also unlike several other Warm Mix technologies this invention does not require the use of water for foaming asphalt and thereby lowering compaction temperatures.

BACKGROUND OF THE INVENTION

Asphalt mixes are widely used in road construction and maintenance and the majority of asphalt mixes that are used currently are produced by the hot method which is generally known as hot-mix or HMA and also known as asphalt concrete. These asphalt mixes consists of asphalt binder and mineral aggregate. The aggregates used could be either natural or processed. Normally processed aggregates are used which have been quarried, crushed, separated into distinct size fractions, washed or otherwise processed to achieve certain performance characteristics of the finished HMA. The aggregates are usually a mixture of various sizes to give desired load bearing strength and properties to the asphalt mix as specified in the mix design.

The strength and durability of the asphalt pavements depends on various factors such as the properties of the materials used, the interaction of the various materials and the mix-design. One of the key factors determining the strength and durability of the asphalt pavement also depends on the ability of the mix to be compacted to the desired design densities and air-voids. A mix that is not properly compacted will have poor strength and will be prone to various pavement distresses. It is important to attain proper coating of the aggregate with asphalt with optimum binder content and good adhesion of asphalt onto the aggregate and good cohesive strength of the asphalt to produce a mix that will have a good performance during the lifetime of the pavement. Pavement is designed to avoid some commonly known distresses such as permanent deformation, fatigue cracking, low temperature cracking and moisture damage.

The mixes are also designed to achieve a specified density and % air-voids. The temperature of the mix has a big influence on the ability to compact. Various grades of asphalt are used in asphalt mixes depending on the predicted traffic load and expected pavement temperatures. Higher PG (Performance Grade) asphalts are used in pavements with a higher traffic load and in areas where the pavement temperatures are higher. For example PG 76-22 asphalt is used on highways in the Southern part of US and in pavements with lower traffic loadings, PG 64-22 asphalts are used. With higher PG grades, binders are usually polymer modified (PMA) and are consequently more viscous requiring much higher mix temperatures to facilitate compaction to the target design densities. One of the important consequences of the higher asphalt temperatures is the substantial increase in asphalt fumes at the hot-mix plant and during construction which are major issues for the environment as well as personnel health. These days there is a major impetus by the asphalt industry to minimize the asphalt fumes to advance environmental stewardship.

Additional benefits in lowering mix and compaction temperatures depending on the technique used are lower fuel costs for the hot-mix producer, lower costs for emission control, lower emissions would permit paving in non-attainment areas where there is strict air pollution regulations. Warm mix asphalt will also allow longer haul distances as the mix at a lower temperature will maintain lower viscosity and workability when it reaches the construction site. Warm-mix asphalt paving could be done at cooler weather compared to hot-mix asphalt and thereby extending the asphalt season e.g. paving late into Fall and paving earlier in Spring. Lower temperature also would reduce oxidative hardening of the asphalt which will enhance pavement performance in extending the pavement life.

There is a definite need for reducing the aggregate mixing, lay down and compaction temperatures while at the same time achieving the designed pavement air voids and density and reducing fume emissions to acceptable levels.

Moisture damage is also of great concern. Moisture damage in asphalt mixes can occur by two major pathways. First water will displace asphalt from the aggregate surface especially the ones containing higher amounts of silica since water has a higher affinity for the aggregate surface compared to asphalt and there is lack of chemical bonding of asphalt to the surface. This is known as stripping. Adhesion is the formation of chemical bond between asphalt and the aggregate. Secondly water over a period of time under repeated load can get inside asphalt and reduce the cohesive strength of asphalt. The results of stripping and loss of cohesive strength of the asphalt on the properties of the mix can be conveniently evaluated by the Hamburg wheel tracking test which measures deformation of the mix by a repeated load under water and by the Tensile strength Ratio test such as ASTM D 4867 procedure.

Several processes and products are being introduced into the market to reduce compaction and mix temperatures which are known as warm-mix technologies and the mixes are known as warm-mix asphalt. These techniques that have been introduced in the market to reduce the mixing and paving temperatures can be broadly classified into three categories. One such technology is the addition of products such a Fisher-Tropsch wax known as Sasobit promoted by Sasol GmbH International, which is a viscosity flow improver that reduces the viscosity of the aggregate mix, thereby reducing the mixing and compaction temperatures. Fischer-Tropsch wax being a plastomeric material suffers from the problems of asphalt binder embrittlement and consequent Low Temperature cracking fatigue as demonstrated by the Bending Beam Rheometer. This technique does not require a significant modification to the hot-mix plant.

A second category of treatments introduces certain amount of water into the mix by different means. When the temperature of the asphalt or the mix is higher than the boiling point of water, water evaporates and causing foaming of asphalt thereby increasing the surface area of asphalt significantly. The foaming process reduces the viscosity of the aggregate mix, thereby helping to produce the aggregate mix at reduced temperatures, which facilitates paving at lower than normal temperatures. The Eurovia Zeolite process works through the generation of foam by liberating water of hydration and in this way helps to generate the foam in asphalt. The MeadWestvaco Warm Mix process uses water from the emulsified asphalt to produce the same foaming effect. In the Shell WAM process water is directly introduced to aggregate hot mixing process to generate foaming of asphalt. These techniques require some modifications to the hot-mix plant. The concern with these moisture foaming technologies is the unknown long term effect of moisture damage since water is deliberately introduced into the mix.

The third category includes methods where there is a change in mechanical design of hot-mix plant that allows production of the mix at lower than normal temperatures and which can be paved at lower than normal temperatures.

On the negative side lower mix temperatures could result in less effective drying of the aggregate. The aggregates which normally contain varying amounts of water depending upon the aggregate stockpile storage location and moisture/rainfall that is prevalent in the area. The presence of water will impede proper bonding of asphalt to the aggregate surface and will result in moisture damage. This is also a concern that needs to be dealt with in the Warm Mix techniques that deliberately introduces water into the mix.

The present invention is concerned with the technical problem of reducing the mixing and paving temperatures and at the same time improving the resistance to moisture resistance of the hot-mix asphalt used for production of road surfaces without sacrificing the performance characteristics of the asphalt mix. More specifically, the present inventors have found that a novel combination of surfactants and rheology modifiers can improve the ease of mixing, lay down and compaction of asphalt mixes by reducing the viscosity of the asphalt binder and aggregate mix during the production and paving of the mix and thereby reduces the compactive effort required to attain the optimum design densities. The unique combination of surfactants that help in compaction also function as adhesion promoters by improving the coating and bonding of the asphalt to the aggregates surfaces. Asphalt binder modified with these surfactants has a higher affinity to aggregate surface compared to water and so water cannot displace or strip asphalt from the aggregate surface. The rheology modifiers also improve the cohesion strength of asphalt at pavement temperatures and thereby further improve the moisture resistance properties of the mix. This is the first instance that a unique combination of surfactants and rheology modifiers have been used as a single package that function as a compaction aid/warm additive and adhesion promoter in one. Unlike other additives and techniques for warm-mix, the current invention does not deliberately introduce water into the mix and does not have any adverse effect on low temperature properties of asphalt as demonstrated by the Bending Beam Rheometer.

SUMMARY OF THE INVENTION

The present invention relates to an additive package for asphalt formulation that comprises a novel combination of surfactant component(s) and rheology modifier(s) component(s). Modifiers which modify the rheology (viscosity) of the asphalt, in particular reduces the viscosity of the asphalt and asphalt aggregate mix at the mixing and paving temperatures. The surfactants ability to reduce the surface tension of asphalt and thereby increasing the wetting characteristics of the asphalt to the aggregate surface further helps in compaction. The combined effect of the rheology modifiers and surfactants aids in compacting the mixes at lower than normal temperatures. Further the additive package of the invention also improves the affinity and chemical bonding of the asphalt to the aggregate surface and thereby increasing the aggregate-asphalt bond's resistance to water, as well as improving the cohesive strength of the asphalt.

DETAILED DESCRIPTION OF THE INVENTION

The present invention relates to a bitumen or asphalt formulation for the pavement of road surfaces, said formulation comprising a mixture of bitumen and aggregates, and an additive package distributed therein.

The additive package of the invention comprises a combination of surface active components and rheology modifying components. The surfactant component preferably comprises at least one or more amine or modified amine surfactants, while the rheology modifying component comprises at least one or more of i) a wax component, and ii) a resin component. The wax component can be derived from crude oil or synthetic sources such as Fischer-Tropsch or Polyethylene or Polypropylene sources in the congealing point range of 60° C. to 150° C. and above.

The additive package of the invention positively influences ability to compact the mixes at lower than normal temperatures by the reduction of viscosity of the asphalt aggregate mix and significantly improves the moisture resistance properties of the asphalt by improving both the adhesion and cohesion properties of asphalt. The combination of rheology modifiers and surfactant does not compromise any of the low temperature requirements of asphalt as demonstrated by the Bending Beam Rheometer.

Any Hot Mix asphalt mixture known to the skilled artisan can be employed in the context of the present invention. For example, standard asphalt wearing course typically contains about 3 to 8% of bitumen, and so-called stone mastic asphalt, which contains about 6.5 to 8.5% of bitumen, can both be readily employed. Since the effect claimed is the ability to compact at lower than normal temperatures and improvement of binder adhesion and cohesion to minimize moisture damage, the concept is applicable to any paving grade asphalts and modified such as the various grades of PG (Performance Graded) asphalts including polymer modified, tire rubber modified asphalts, asphalts modified by Gilsonite or Trinidad Lake Asphalt, and similar materials.

As previously discussed, the additive package of the invention comprises from about 10 to 60% by weight of an amine or modified amine surfactant, and from about 20 to 90% of a rheology modifying component. The surfactant component preferably comprises at least one amine or modified amine surfactant, while the rheology modifying component comprises at least one or more of i) a wax component, and ii) one or more resin component(s). With certain asphalt mixes, mixtures of two or more rheology modifying components, which may fall into any of the groups i)-ii), can be employed. In another embodiment, the additive package of the invention comprises 20 to 60% by weight of an amine or modified amine surfactant, and from about 30 to 80% of a rheology modifying component(s). If the rheology modifying component comprises two rheology modifiers from separate classes i), or ii) in accordance with the invention, it is preferred that they are present in a ratio of from 20:80 to 80:20; more preferably 40:60 to 60:40, and in another embodiment, in approximately 50:50 proportions.

A more detailed description of each of the additive package and each of the component materials and properties thereof follows.

The Surfactant Component

The surfactant component of the additive package of the invention comprises at least one amine and/or modified amine surfactant or mixtures thereof. In one example, the surfactant component is selected from amines, diamines, polyamines, ethoxylated amines, ethoxylated alkyl diamines, ethoxylated alkyl polyamines, amido amines, amidopolyamines, imidazolines, and/or any of their corresponding organic and/or inorganic salts, and mixtures and combinations of same. Some examples of the amine and/or modified amine surfactants employable in the context of the invention are generally depicted by the following general formulae:

I. Amines

wherein R is a saturated or unsaturated, substituted or unsubstituted, optionally branched or cyclic, hydrocarbon radical group with 8-24 carbon atoms, for example derived from tallow fatty acids, or tall oil fatty acids. $R^1$ and $R^2$ can be the same or different and are selected from hydrogen or hydrocarbon radical chain with 1-24 carbon atoms. $R^1$ and $R^2$ are preferably selected from hydrogen or methyl. A representative example is hydrogenated tallowamine (CAS No. 61788-45-2).

II. Diamines and Polyamines

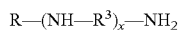

where R has the same meaning as in I, above, and $R^3$ represents a linear or branched hydrocarbon radical with 1-6 carbon atoms. In one embodiment $R^3$ is propylene radical (—CH2CH2CH2—) and x is a small integer of less than or equal to 6. A representative example, where R=tallow, x=1 and $R^3$=propylene, is N-tallow propylenediamine (CAS No. 61791-55-7)

III. Ethoxylated and/or Propoxylated Amines

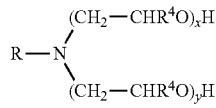

where R has the same meaning as in I, above; and x and y are independently selected from 0, 1 or 2, and each $R^4$ is independently selected from H or $CH_3$. In one embodiment, x=y=1. A representative example, where $R^4$=H and R=hydrogenated tallow alkyl, x=y=1 is N,N diethanol, hydrogenated tallowamine (CAS No. 90367-28-5).

IV. Ethoxylated and/or Propoxylated Alkyl Diamines and Ethoxylated Alkyl Polyamines e.g.

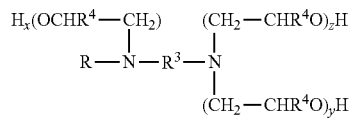

wherein R and $R^3$ have the same meaning as in II, above; x, y, and z are independently selected from 0, 1 or 2 and x+y+z< or = 5, and each $R^4$ is independently selected from H or $CH_3$. In one embodiment, x=y=z=1. A representative example, where x=y=z=1, $R^4$=H and $R^3$=propylene is N,N, N'Tris(2-hydroxyethyl)-N-hydrogenated tallow-1,3-diaminopropane (CAS No. 90367-25-2).

V. Amido Amines

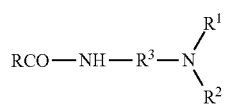

wherein R, $R^1$, $R^2$ and $R^3$ has the same meaning as in I, above. A representative example is where $R^1$=$R^2$=methyl and $R^3$=propylene and R=$C_8$-$C_{22}$ alkyl has the CAS No. 84082-43-9.

VI. Amidopolyamines and Imidazolines e.g.

wherein R and $R^3$ have the same meaning as in example I, above, and x=an integer of from 1 to 10. This group includes the reaction product of fatty acids or esters with complex mixtures of polyethylenepolyamines and related compounds which may contain also cyclic and substituted nitrogens obtained as by-products in the manufacture of diethylene triamine and ethylene diamine. Representative compounds have the CAS Nos 402591-95-1, 68910-93-0, 103213-06-3, 95-38-5.

The products listed above may be present in the mixtures described in the invention as their salts or organic or inorganic acids including but not limited to the salts of long chain fatty acids, e.g. stearic acid, salts of phosphoric acids, or substituted phosphoric acids, acetic acid, naphthenic acids, rosin acids etc.

Specific surfactants useful in the additive package of the invention include, but are not limited to ethoxylated tallow amines, fatty amines, fatty amine derivatives, tall oil amidoamines/imidazolines, bis hexamethylene triamine and higher oligomers of hexmethylediamine, other alkyl amine surfactants with a hydrocarbon chain consisting of 8 to 22 carbon atoms and mixtures combinations thereof. Specific examples of such surfactants include, but are not limited to tallow n-propylene diamine, tris-ethoxylated tallow N-propylene diamine, Redicote C-450, a mixture of imidazolines and amidopolyethylenepolyamines, Wetfix 312—a mixture of imidazolines and amidoamines available from Akzo Nobel Surface Chemistry LLC, Chicago, Ill. The surfactant component can also include hydrogenated tallow propylene diamine, ethoxylated hydrogenated tallow propylene diamine, tallow dipropylene triamine, tallow tripropylene tetramine and their derivatives, and amides resulting from the condensation fatty acids with dimethylaminopropylamine.

Rheology Modifying Component

The rheology modifying component of the additive package of the invention comprises i) at least one hydrocarbon polymer component which could include materials commonly known as waxes, ii) at least one resin component and mixtures and combinations thereof.

i) Wax Component:

Wax modifiers that can be usefully employed in the context of the invention include, but are not limited to waxes of vegetable (e.g. carnuba wax), animal (e.g. beeswax) mineral (e.g. Montan™ wax from coal, including oxidised waxes; amide waxes (e.g. ethylene bis stearamide, stearyl amide, stearylstearamide); fatty acids and soaps of waxy nature (e.g. aluminum stearate, calcium stearate, fatty acids); other fatty materials of waxy or resinous nature (fatty alcohols, hydrogenated fats, fatty esters etc) with the ability to stiffen asphalt, and the like, polymers of plastomer (polyethylene, polypropylene, ethylvinylacetate). Fischer Tropsch wax from coal) or petroleum (e.g. paraffin wax, polyethylene wax, Fischer-Tropsch wax from gas) origin including oxidized waxes can also be used in accordance with the invention. In one embodiment, the amount of the Fischer-Trospsch wax or its derivative introduced in to the asphalt is kept below 0.5% by the weight of the asphalt/bitumen. The wax component can be derived from crude oil or Fischer-Tropsch process or other synthetic wax processes such as for example Polyethylene and polypropylene waxes in the congealing point range of 60° C. to 150° C. and above. The above products are basically soluble in the asphalt at the temperatures of the hot mix, to make a homogeneous binder, and/or will melt at the temperature of the mix and the ingredients will disperse/dissolve into the mixture. The wax and resin ingredients will generally act to improve the viscosity and flow properties of asphalt at the mix and compaction temperatures and improve the cohesion properties of the asphalt at pavement temperatures, while the surfactant component reduce the surface tension and coating ability of asphalt and thereby further assist in compaction and at the same time will improve the adhesion of the asphalt to the aggregate. Together the ingredients provide improved compaction at lower than normal temperature while improving the adhesion and cohesion properties of the mix making it more resistant to moisture damage.

In one embodiment, the invention preferably employs a hydrocarbon polymer also known as polyethylene wax derived from polymerization of ethylene in the presence of a catalyst (Ref). The congealing point of the wax is between 80° C. and 120° C. with a Brookfield viscosity at 135° C. in the range of 10 to 40 cPs.

ii) Resin Component:

A second type of rheology modifying component comprises resins of vegetable (tall oil pitch, pine tar pitch, tall oil rosins, rosin acids, pine rosins, gum rosins including chemically modified resins like maleated and fumarated rosins and resinous by-products from tall oil processing or the processing of gum rosins.) or petroleum (petroleum resins, phenolic resins). In particular resins having a Drop melt point >60° F., in another embodiment >60° C., and a Penetration <50 at 25° C., for example Tall Oil pitch or modified tall oil pitches containing long chain and tricyclic organic acids and sterols, are useful. The tall oil resin based modifiers may also include non-resinous fractions from distillation of crude tall oil such as fatty acids, tall oil heads, and may also include chemically modified version of these fractions as a result of maleation and fumarization. Preferred rheology modifiers of this class include, but are not limited to tall oil pitch, maleated tall oil pitch, rosin acids, tall oil heads. Polymers of elastomer (natural rubber, styrene butadiene rubber, polychlorprene, crumb rubber from reclaimed tires etc) character; asphaltic materials of high softening point (e.g. asphaltenes, Gilsonite™, Trinidad Lake Asphalt, by-products from the deasphalting of oils, oxidised asphalts etc); asphaltenes such as ROSE bottoms (Residuum Oil Supercritical Extraction) and other zero penetration asphalts may also be employed either alone or in combination.

In broader terms the invention contemplates a combination of surface active agents with one or more asphalt rheology modifiers which might include polyethylene wax, polypropylene wax, Fischer-Tropsch wax, crude oil derived waxes, other types of wax, polymers, Gilsonite, or tall oil based modifiers, the key feature being that these types of ingredients have been combined into a single product.

The warm mix additives of the invention can be added as a single additive package, or the individual components of said additive package. Whether added as a single package, or as individual components, the additives of the invention can be added at various stages of the warm mix process. In one embodiment, the additive package of the invention can be blended into the asphalt binder before the asphalt is introduced to the aggregate in the hot-mix plant, it can be added to the aggregate, or a portion of the aggregate, before asphalt is added to the mixer or it can be added to the mixer in the hot-mix plant after asphalt has been added to the aggregate. It is preferably added into the mixer such as the drum mixer at the hot-mix plant. The dosage level of the additive package by the weight of the asphalt is in a range from 0.2 to 10% by weight, preferably in the range from 0.5 to 6% by weight, and further preferably about 1 to 3% by weight, based on asphalt binder.

The additive package of the invention has the following advantages over current technologies:

(a) It not only helps to lower the hot-mix production and compaction temperatures but also at the same time improves the moisture resistance properties of the mix. It is a warm-mix additive and an adhesion promoter/antistripping additive in a single package, or the individual components of said package can be added separately. As a warm-mix additive it reduces the viscosity and improves the flow properties of asphalt along with its coating ability to the aggregate surfaces and thereby reduces the temperature required to compact an asphalt mix by 15 to 60° F. lower compared to an asphalt mix without the additive package. As an adhesion and cohesion modifier it improves the moisture resistance of mixes as demonstrated by the Tensile Strength Ratio test and the Hamburg Wheel Tracking Tests.

(b) Unlike other wax based warm-mix additives such as Fischer-Tropsch waxes does not suffer from the problems of asphalt binder embrittlement and consequent low temperature cracking fatigue as demonstrated by the Bending Beam Rheomoter test.

(c) The additive package of the invention, because of melting point and physical characteristics allows it to be formulated in a physical form such as powder, pastillated, or flaked free flowing solid or liquid which can be blended into asphalt binder just before production of the hot-mix or could be added to the drum dryer at various stages during the production of the hot-mix, as described above.

The invention will now be illustrated by the following non-limiting examples.

Compaction or Densification Tests

The Densification test were done with a PG76-22 asphalt and a granite aggregate in an asphalt mix whose aggregate gradation and asphalt contents are listed in Table 1.

TABLE 1

Target gradation and asphalt content

| Sieve Size | % Passsing JMF | Actual |
|---|---|---|
| 19.0 | 100.0 | 99.0 |
| 12.5 | 90.00 | 87.9 |
| 9.5 | 83.00 | 79.9 |
| 4.75 | 52.00 | 49.6 |
| 2.36 | 34.00 | 32.2 |
| 1.18 | 25.00 | 23.6 |
| 0.6 | 19.00 | 18.6 |
| 0.3 | 13.00 | 14.7 |
| 0.15 | 5.00 | 5.3 |
| 0.075 | 2.90 | 2.9 |
| Asphalt % | 5.3 | 5.1 |

The densification was carried out with a vibratory compactor for a period of 30 seconds as described in the NCAT (National Center for Asphalt Testing) Report Dated June 2005 and the % air-voids were measured. Three different compaction temperatures were used and in each case the aggregate mix with binder was prepared at 35° F. above the respective compaction temperatures. Three separate mixes were evaluated at each of the three compaction temperatures:
(a) Warm Mix formulation AN 003 at 2% on PMA binder PG 76-22.
(b) Warm Mix formulation AN oo4 at 2% on PMA binder PG 76-22.
(c) PMA 76-22 binder without any Warm Mix additive as Control.
The results are listed below in Table 2.

TABLE 2

Densifications Test Results - Air Voids % at different compaction temperatures.

| Temp. | 300° F. | | | 270° F. | | | 240° F. | | |
|---|---|---|---|---|---|---|---|---|---|
| Sample | AN 003 | AN 004 | PG 76-22 | AN 003 | AN 004 | PG 76-22 | AN 003 | 004 | PG 76-22 |
| 1 | 5.1 | 4.2 | 5.5 | 5.2 | 4.9 | 6.0 | 6.0 | 5.4 | 6.5 |
| 2 | 5.0 | 5.0 | 5.4 | 5.3 | 4.5 | 6.8 | 6.0 | 5.9 | 7.1 |
| 3 | 5.0 | 4.9 | 5.3 | 5.0 | 4.3 | 6.5 | 6.3 | 5.4 | 7.5 |
| 4 | 5.0 | 5.0 | 5.3 | 5.8 | 4.5 | 6.2 | 6.5 | 5.5 | 6.5 |
| 5 | 4.7 | 3.8 | 5.8 | 5.7 | 4.6 | 7.0 | 6.4 | 6.2 | 6.3 |
| 6 | 5.0 | 5.0 | 5.4 | 5.6 | 4.9 | 6.6 | 6.3 | 5.5 | 6.8 |
| Avg. | 4.9 | 4.6 | 5.5 | 5.4 | 4.6 | 6.5 | 6.3 | 5.7 | 6.8 |
| Std. Dev. | 0.14 | 0.53 | 0.19 | 0.31 | 0.23 | 0.37 | 0.21 | 0.33 | 0.45 |

"AN 003" is a mixture illustrating the invention and comprises:
Toprez LM (tall oil derived resin ex Chusei) - 10%
N-tallow propylene diamine 37.5%
Fischer Tropsch wax 21.5%
Polyethylene wax (ex Chusei) 31.0%
AN 004" is a mixture illustrating the invention and comprises:
Toprez LM (tall oil derived resin ex Chusei) - 20%
N-tallow propylene diamine 37.5%
Polyethylene wax (ex Chusei) 42.5%

The results clearly shows that the % air voids are significantly lower with AN 003 and AN 004 at 300° F., 270° F. and 240° F. compared to the control and also the % air voids are lower at 270° F. lower compared to the control at 300° F. In the case of AN 004 the resulting % air voids at 240° F. is similar compared to the control at 300° F. The results indicate that compaction can be done at 30 to 60° F. lower and still get the % air voids lower or equal to the air voids obtained compacting the unmodified asphalt at 300° F. thereby demonstrating the claim of Warm Mix.

Moisture Sensitivity Tests

Moisture damage in asphalt mixes can be evaluated either by the Hamburg Wheel Tracking test and by the Tensile Strength Ratio test according the ASTM D 4867 which is also commonly known as the modified Lottman and Root Tunniclif Test.

Tensile Strength Ratio Tests ASTM D4867:

Here there are two sets of compacted specimens. The conditions specimens are exposed to water by a variety of procedures to simulate moisture damage and the unconditioned specimens are maintained at room temperature. Then the Indirect Tensile Strength is measured and the Tensile strength ratio is obtained by dividing the conditioned strength by the unconditioned strength. A ratio of 0.8 or higher is normally considered acceptable. The results are listed in Table 3.

TABLE 3

Tensile Strength Ratio Tests

| Warm-Mix Additive | Conditioned Tensile Strength Psi | Unconditioned Tensile Strength Psi | Tensile Strength Ratio |
|---|---|---|---|
| AN 003 | 74.7 | 79.4 | 0.94 |
| AN 004 | 74.2 | 83.7 | 0.89 |

*The specimens for the TSR test with additives AN 003 and AN 004 were compacted at 270° F.

The results show that the Tensile Strength ratio is above 0.80 with the mixes modified with the two warm-mix additives (AN 003 and AN 004), which is the qualifying criteria with most specifying agencies. In prior Warm Mix testing by NCAT, the Tensile Strength Ratio was consistently a problem with the other Warm Mix technologies evaluated and needed the addition of an anti-strip agent to mitigate against moisture damage.

Hamburg Wheel Tracking Test:

In the test method compacted samples of asphalt mixtures are subjected to repeated wheel tracking cycles under water.

Failure of the sample is shown by deformation (rutting). A stripping inflection point is the point at which there is a considerable change in the slope of the rutting curve (rut depth plotted against the number of cycles). In general the accepted criteria is that the stripping inflection point should happen after 10,000 cycles. Some agencies specify a deformation of 12.5 mm as the point of failure. The number of cycles to 12.5 mm deformation is a measure of the performance of the mixture. The results are listed in Table 4.

TABLE 4

Hamburg Wheel Tracking Test Results

| Mix Type | Air Voids, % | Compaction Temp., F. | Stripping Inflection Point, cycles | Avg. Stripping Inflection Point, cycles | Rutting Rate, mm/hr | Avg. Rutting Rate, mm/hr | Total Rutting @ 10,000 cycles, mm | Avg. Total Rutting, mm |
|---|---|---|---|---|---|---|---|---|
| AN 003 #1 | 7.2 | 270 | >10,000 | >10,000 | 0.513 | 0.801 | 5.15 | 5.89 |
| AN 003 #2 | 7.0 | 270 | >10,000 | | 1.089 | | 6.62 | |
| AN 004 #1 | 7.0 | 270 | >10,000 | >10,000 | 0.396 | 0.345 | 4.73 | 4.25 |
| AN 004 #2 | 7.0 | 270 | >10,000 | | 0.294 | | 3.77 | |

It can be seen from the results that the stipping inflection point happens after 10,000 cycles with both additives and the average rut depth is 5.89 mm and 4.25 mm with AN 003 and AN 004 respectively.

Asphalt PG Grade Testing:

It is essential that the additives do not adversely affect the properties of the asphalt binder especially the low temperature properties of the asphalt as measured by the Bending Beam Rheometer Test. So PG 76-22 binder modified with 2% AN 003 and separately with AN 004 were subjected to the standard PG grading tests (AASHTO T 315, and T 313). The results are listed in Table 5.

TABLE 5

Performance Grade Testing Results

| Test | PG 76-22 | PG 76-22 + 2% AN 003 | PG 76-22 + 2% AN 004 |
|---|---|---|---|
| G*/Sin d (kPa) @ 76° C. | 1.17 | 1.05 | 1.03 |
| RTFOT G*/Sin d (kPa) @ 76° C. | 2.49 | 2.27 | 2.25 |
| BBR Creep Stiffness, S, @ −12° C. | 185 | 144 | 140 |
| BBR, Slope m-Value @ −12° C. | 0.316 | 0.342 | 0.344 |
| Original Binder Phase Angle @ 76° C., Degrees | 73.8 | 70.20 | 72.0 |

Note that the Low Temperature flexibility properties as measured by the m-Value (should be above 0.3) and Creep Stiffness (lower the better) are significantly improved by the additive compared to the control PMA 76-22 without additive.

In summary these warm-mix additives can help to lower mix and compaction temperatures by about 60° F. as demonstrated by the compaction tests and at the same time provide a mix resistant to water damage as demonstrated by the TSR and the Hamburg Wheel Tracking Test. Unlike other wax modifiers these warm-mix additives do not have any detrimental effect on the lower temperature properties of asphalt as demonstrated by m-value and Creep Stiffness PG grade testing.

We claim:

1. An additive package for warm-mix asphalt formulations for the pavement of road surfaces, said additive package comprising a) from about 20 to about 60 wt %, based on the total weight of the additive package of surfactant component, and
b) about 30 to about 80 wt % of the additive package of an asphalt rheology modifying component, wherein said asphalt rheology modifying component comprises at least one wax component and at least one resin component, wherein the surfactant component comprises at least one surfactant selected from the group consisting of amines, diamines, polyamines, ethoxylated amines, ethoxylated alkyl diamines, ethoxylated alkyl polyamines, amido amines, amidopolyamines, imidazolines, any of their corresponding organic or inorganic salts, and mixtures thereof, wherein the wax component is selected from the group consisting of carnuba wax, beeswax, montan wax from coal, Fischer Tropsch wax from coal, petroleum or gas origin, amide waxes, fatty acids and soaps; fatty alcohols, hydrogenated fats, fatty esters, and mixtures thereof, wherein the resin component is selected from the group consisting of tall oil pitch, pine tar pitch, tall oil rosins, rosin acids, pine rosins, gum rosins, maleated rosins, fumarated rosins, resinous by-products from tall oil processing or the processing of gum rosins, petroleum resins, phenolic resins, maleated tall oil pitch, tall oil heads, natural rubber, styrene butadiene rubber, polychlorprene, crumb rubber, asphaltenes, uintahite, dried asphalt, Trinidad refined asphalt, by-products from the deasphalting of oils, oxidised asphalts, zero penetration asphalts, and mixtures thereof, and wherein said resin component has a Drop melt point >60° F. and a Penetration <50 at 25° C.

2. The additive package of claim 1 wherein the surfactant component comprises at least one surfactant selected from the group consisting of I. Amines

wherein R is a saturated or unsaturated, substituted or unsubstituted, optionally branched or cyclic, hydrocarbon group with 8-24 carbon atoms, $R^1$ and $R^2$ can be the same or different and are hydrogen or hydrocarbon chain with 1-24 carbon atoms;

II. Diamines and Polyamines

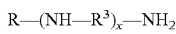

where R has the same meaning as above, and $R^3$ represents a linear or branched hydrocarbon radical with 1-6 carbon atoms, and x represents an integer of less than or equal to six;

III. Ethoxylated and/or Propoxylated Amines

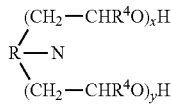

where R has the same meaning as above; and x and y are independently 0, 1 or 2 and each $R^4$ is independently H or $CH_3$;

IV. Ethoxylated and/or Propoxylated alkyl Diamines and ethoxylated alkyl polyamines

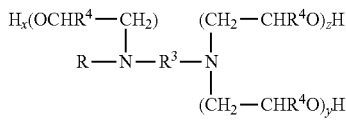

wherein R and $R^3$ have the same meaning as above; x, y, and z are independently 0, 1 or 2 and x+y+z< or =5, and each $R^4$ is independently H or $CH_3$;

V. Amido amines

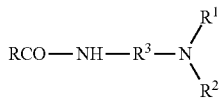

wherein R, $R^1$, $R^2$ and $R^3$ has the same meaning as above; and

VI. Amidopolyamines and imidazolines

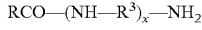

wherein R and $R^3$ have the same meaning as above, and x=an integer of from 1 to 10.

3. The additive package of claim 1 wherein said surfactant component comprises at least one amine and/or modified amine surfactant selected from the group consisting of ethoxylated tallow amines, fatty amines, fatty amine derivatives, tall oil amidoamines/imidazolines, bis hexamethylene triamine and higher oligomers of hexmethylediamine, alkyl amine surfactants with a hydrocarbon chain consisting of 8 to 22 carbon atoms and mixtures thereof.

4. The additive package of claim 1 wherein said surfactant component is selected from the group consisting of tallow n-propylene diamine, tris-ethoxylated tallow N-propylene diamine, a mixture of imidazolines and amidopolyethylenepolyamines, a mixture of imidazolines and amidoamines, hydrogenated tallow propylene diamine, ethoxylated hydrogenated tallow propylene diamine, tallow dipropylene triamine, tallow tripropylene tetramine and derivatives thereof, and amides resulting from the condensation fatty acids with dimethylaminopropylamine.

5. The additive package of claim 1 wherein said wax component is selected from the group consisting of paraffin wax, polyethylene wax, ethylene bis stearamide, stearyl amide, stearylstearamide; aluminum stearate, calcium stearate, fatty acids; fatty alcohols, hydrogenated fats, fatty esters and mixtures thereof.

6. The additive package of claim 5 wherein the congealing point of said wax is between 60° C. and 150° C. with a Brookfield viscosity at 135° C. in the range of 10-40 cPs.

7. A warm mix asphalt formulation for the pavement of road surfaces, said formulation comprising a mixture of bitumen and aggregates, and from about 0.2 to 10% by weight of the additive package of claim 1, based on the weight of the asphalt.

8. The formulation of claim 7 wherein the temperature required to compact said asphalt is 15-60° F. lower than conventional hot mix asphalts.

9. The asphalt formulation of claim 7 wherein said asphalt and aggregates are mixed in a mixer, and wherein said additive package a) is blended into said asphalt binder before the aggregates are introduced to the mixer; or b) added to the aggregates, or portion of the aggregates before the asphalt is introduced to the mixer; or c) added to the mixer after the asphalt has been added to the aggregate in said mixer, or combinations of a)-c).

10. A method for lowering the compaction temperature of warm mix asphalt, said method comprising adding to said warm mix asphalt a compaction temperature lowering amount of the additive package of claim 1.

11. The method of claim 10 wherein from about 0.2 to 10% by weight of the additive package of claim 1, based on the weight of the asphalt, is added to said warm mix asphalt, and wherein the temperature required to compact said asphalt is at least 15-60° F. lower than conventional hot mix asphalts.

12. The warm mix asphalt of claim 7 wherein said additive package is added as a single package, or the individual components of said package are added separately to the warm mix asphalt.

13. The warm mix asphalt of claim 7 wherein the additive package, or individual components thereof, are added at various stages of the warm mix process.

14. The warm mix asphalt of claim 13 wherein the additive package, or individual components thereof are blended into the asphalt binder before the asphalt is introduced to the aggregate in the hot-mix plant, added to the aggregate, or a portion of the aggregate, before asphalt is added to the mixer, and/or added to the mixer in the hot-mix plant after asphalt has been added to the aggregate.

* * * * *